WILHELM WIESMANN, OF BONN, PRUSSIA.

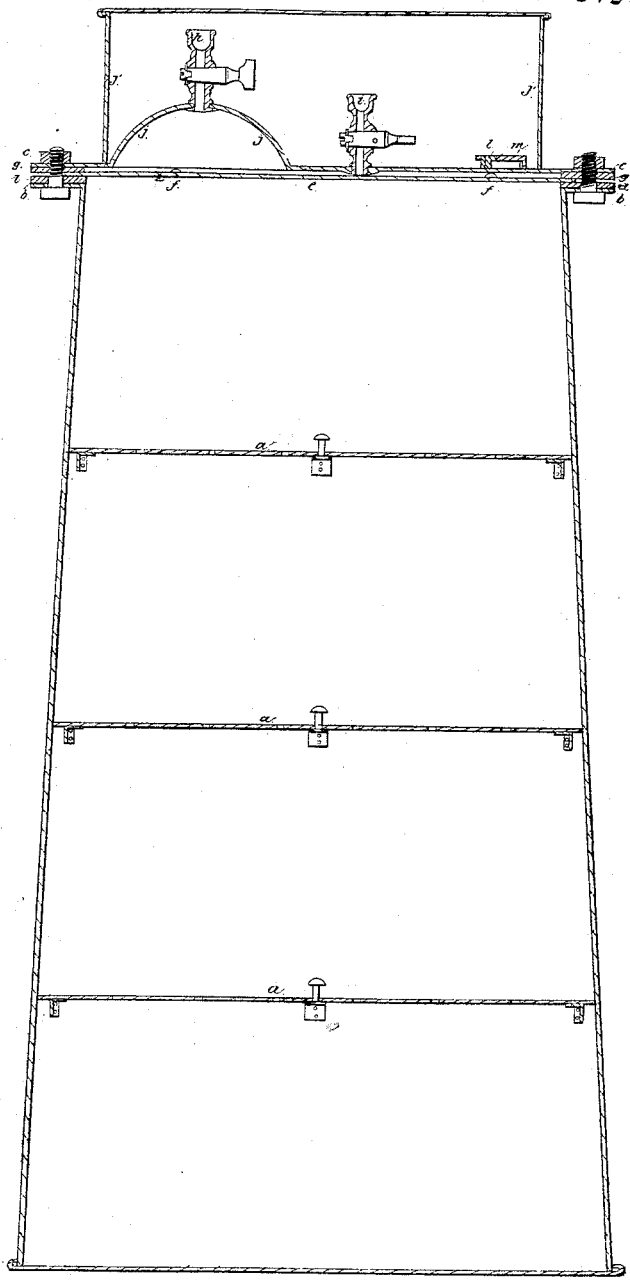

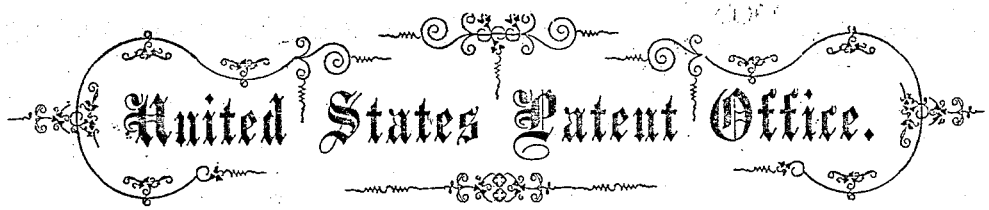

Letters Patent No. 84,038, dated November 10, 1868.

IMPROVEMENT IN PRESERVING MEAT.

The Schedule referred to in these Letters Patent and making part of the same.

*To all whom it may concern:*

Be it known that I, WILHELM WIESMANN, of Bonn, in Prussia, have invented a new and useful Improvement in Preserving Meat; and I do hereby declare the following to be a full, clear, and exact description thereof, which will enable those skilled in the art to make and use the same, reference being had to the accompanying drawing, forming part of this specification, which drawing represents a vertical central section of the apparatus which I use in carrying out my invention.

This invention consists in sprinkling the pieces of meat with powdered saltpetre, then coating them with olive-oil, and finally, putting them up in alternate layers with bags filled with animal-charcoal, in such a manner that, by the coating of oil and saltpetre, the meat is protected against the influence of the atmosphere, and, by the charcoal, all the air contained between the layers, and all the gases emanating from the meat, and capable of predisposing decomposition, are absorbed, and the meat can be preserved for a long time.

The vessel in which the meat is put up contains a series of horizontal perforated partitions, and its top is provided with an oil-space, whereby the same can be hermetically closed against the access of the atmospheric air.

In carrying out my invention, I separate the meat carefully from all the bones, wash it, and wipe and press it in linen cloth, until all the blood and moisture have disappeared.

When it is desired to preserve the meat for more than two months, I heat the meat in a suitable apparatus by the action of steam, for the purpose of coagulating the albuminous substances; but this heating-process can be dispensed with if the meat is to be preserved for less than two months.

After the pieces of meat have been prepared, as above described, I sprinkle them with pulverized saltpetre, in the proportion, one part, by weight, of saltpetre, to three hundred parts of meat, and then I coat them with a layer of olive-oil, applied by a brush or in any other suitable manner.

After each piece of meat has thus been carefully covered with saltpetre and a coat of olive-oil, I place the same into a suitable vessel, in which the same are compressed in layers of about six inches depth, and between these layers of meat I introduce layers of animal-charcoal, formed by filling said charcoal, in a granulated state, into coarse linen bags, in the proportion of about one part, by weight, of coal, to eight parts of meat, each bag being made to contain about three ounces of coal, while a small quantity of the coal is reserved for the purpose of filling up the interstices remaining between the adjacent bags.

By the charcoal, the air contained in the receiving-vessel is absorbed, and also the gases emanating from the meat, and liable to cause or promote decomposition.

The vessel A, in which I place the meat, is, by preference, made in the form of a truncated cone, of tinned or enamelled sheet-iron, or any other suitable material. In the interior of this vessel is placed a series of perforated diaphragms, $a$, which are supported by angular lugs attached, at suitable distances apart, to the interior of said vessel. On the diaphragms or shelves is placed a layer of bags filled with charcoal, then a layer of meat, and so on, until the vessel is filled, care being taken to have a layer of charcoal-bags on the top.

The vessel A is closed by a lid, $c$, which is secured to a flange, $b$, on the edge of the vessel. Between the lid and the flange a disk, $e$, of sheet-metal, is introduced, and the joints between this disk and the flange $b$ and the lid $c$ are rendered tight by packing-rings $g\ d$, of card-board steeped in tallow or any other suitable material.

From the disk $e$ rise projections, $f$, which serve to support the lid $c$.

The lid $c$ is provided with a stop-cock, $h$, which is secured in the hemispherical cap $j$, and with another stop cock, $i$, which is secured directly in the lid. Each of these cocks is provided with a cup-shaped mouth-piece, and the mouth-piece of the cock $i$ is about on a level with the top of the cap, $j$. Through the cock $h$ olive-oil is introduced into the space below the lid $c$ and disk $e$, and as soon as the oil rises into the mouth-piece of the cock $i$, both cocks are closed. By the layer of oil thus formed on the top of the disk $e$, the access of air to the interior of the vessel A is effectually prevented.

Having thus described my invention,

What I claim as new, and desire to secure by Letters Patent, is—

1. The within-described process of preserving meat, by first coating the pieces of meat with powdered saltpetre and olive-oil, and then storing them away in a hermetically-closed vessel, with intermediate layers of charcoal filled in bags, as herein set forth.

2. The vessel A, provided with perforated movable shelves $a$, and closed by a disk, $e$, and lid $c$, leaving an oil-space, which is filled through stop-cocks $h\ i$, all as shown and described.

WILHELM WIESMANN.

Witnesses:
W. LANGELÜDDECKE,
KASPAR LÜCKE.